(12) United States Patent
Lee

(10) Patent No.: US 11,094,972 B2
(45) Date of Patent: Aug. 17, 2021

(54) BATTERY PACK AND MANUFACTURING METHOD THEREFOR

(71) Applicant: LG CHEM, LTD., Seoul (KR)

(72) Inventor: Bum Jick Lee, Cheongju-Si (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/482,999

(22) PCT Filed: Feb. 8, 2018

(86) PCT No.: PCT/KR2018/001706
§ 371 (c)(1),
(2) Date: Aug. 1, 2019

(87) PCT Pub. No.: WO2018/203593
PCT Pub. Date: Nov. 8, 2018

(65) Prior Publication Data
US 2020/0014081 A1 Jan. 9, 2020

(30) Foreign Application Priority Data
May 4, 2017 (KR) .......... 10-2017-0056974

(51) Int. Cl.
| | |
|---|---|
| *H01M 10/42* | (2006.01) |
| *H01M 10/647* | (2014.01) |
| *H01M 50/20* | (2021.01) |
| *H01M 50/147* | (2021.01) |
| *H01M 50/531* | (2021.01) |

(52) U.S. Cl.
CPC ..... *H01M 10/4257* (2013.01); *H01M 10/647* (2015.04); *H01M 50/147* (2021.01); *H01M 50/20* (2021.01); *H01M 50/531* (2021.01)

(58) Field of Classification Search
None
See application file for complete search history.

(56) References Cited

U.S. PATENT DOCUMENTS

| | | | |
|---|---|---|---|
| 2008/0171235 A1* | 7/2008 | Seo | ............ H01M 10/42 429/7 |
| 2008/0292955 A1 | 11/2008 | Byun et al. | |
| 2009/0123834 A1 | 5/2009 | Byun | |
| 2009/0130494 A1 | 5/2009 | Jang | |

(Continued)

FOREIGN PATENT DOCUMENTS

| | | |
|---|---|---|
| JP | 2005-158308 A | 6/2005 |
| JP | 2006-331818 A | 12/2006 |

(Continued)

OTHER PUBLICATIONS

Extended European Search Report for European Application No. 18794611.6, dated Nov. 28, 2019.

(Continued)

*Primary Examiner* — Ula C Ruddock
*Assistant Examiner* — Thomas H. Parsons
(74) *Attorney, Agent, or Firm* — Birch, Stewart, Kolasch & Birch LLP

(57) ABSTRACT

A battery pack and a method for manufacturing the same, and more particularly, to a battery pack includes a top cap having a hook protrusion for protecting a PCB connected to a pouch-type battery cell and a method for manufacturing the same.

10 Claims, 5 Drawing Sheets

(56) References Cited

U.S. PATENT DOCUMENTS

| | | |
|---|---|---|
| 2009/0297891 A1 | 12/2009 | Byun et al. |
| 2010/0136373 A1 | 6/2010 | Jang et al. |
| 2010/0136418 A1 | 6/2010 | Jang et al. |
| 2010/0316892 A1 | 12/2010 | Kim |
| 2011/0097606 A1 | 4/2011 | Namura |
| 2012/0052331 A1 | 3/2012 | Park |
| 2013/0040170 A1 | 2/2013 | Choi et al. |
| 2013/0164599 A1 | 6/2013 | Kim |
| 2014/0141289 A1 | 5/2014 | Choi et al. |
| 2014/0178715 A1 | 6/2014 | Koh |
| 2015/0004441 A1 | 1/2015 | Jeong et al. |
| 2015/0287972 A1 | 10/2015 | Choi |
| 2015/0287976 A1 | 10/2015 | Choi |
| 2016/0218330 A1* | 7/2016 | Seong ............... H01M 2/06 |
| 2018/0261900 A1* | 9/2018 | Kim ............... H01M 10/425 |

FOREIGN PATENT DOCUMENTS

| | | |
|---|---|---|
| JP | 2008-27624 A | 2/2008 |
| JP | 2008-293940 A | 12/2008 |
| JP | 2009-70736 A | 4/2009 |
| JP | 2011-3523 A | 1/2011 |
| JP | 2011-90883 A | 5/2011 |
| JP | 4698171 B2 | 6/2011 |
| JP | 2012-3953 A | 1/2012 |
| JP | 2012-49105 A | 3/2012 |
| JP | 3177469 U | 8/2012 |
| JP | 2013-41810 A | 2/2013 |
| KR | 10-1023898 B1 | 3/2011 |
| KR | 10-2013-0018577 A | 2/2013 |
| KR | 10-2013-0044821 A | 5/2013 |
| KR | 10-2014-0081657 A | 7/2014 |
| KR | 10-2015-0038914 A | 4/2015 |
| KR | 20150038914 * | 4/2015 |
| KR | 10-2015-0115558 A | 10/2015 |
| KR | 10-2015-0115559 A | 10/2015 |
| KR | 10-2016-0092750 A | 8/2016 |
| KR | 10-1689219 B1 | 12/2016 |
| KR | 10-2017-0043928 A | 4/2017 |

OTHER PUBLICATIONS

International Search Report for PCT/KR2018/001706 (PCT/ISA/210) dated May 14, 2018.

* cited by examiner

Prior Art

S510

S520

S530

BATTERY PACK AND MANUFACTURING METHOD THEREFOR

TECHNICAL FIELD

The present invention relates to a battery pack and a method for manufacturing the same, and more particularly, to a battery pack including a top cap having a hook protrusion for protecting a PCB connected to a pouch-type battery cell and a method for manufacturing the same.

BACKGROUND ART

Typical battery packs are lithium secondary batteries and classified into cylindrical type, prismatic type, and pouch type according to the shape of a battery case.

Among them, such a pouch-type lithium secondary battery (hereinafter, referred to as a battery pack) has flexibility and also has a relatively free shape, is lightweight, and has excellent safety, and thus, demand for portable electronic devices such as mobile phones, camcorders, and notebook computers is increasing.

A variety of combustible materials are contained in the battery pack, and thus, the battery pack has a serious disadvantage in terms of safety because of the risk of overcharging, overcurrent, other physical external impacts, and the like, resulting in heat generation and explosion.

Thus, the battery pack is provided with a protection circuit module (PCM) for continuously detecting a value such as a voltage, current, a temperature and effectively controlling an abnormal state thereof, which is determined on the basis of the detected value and a safety element such as a fuse-type positive temperature coefficient (PTC) element and a thermal cut-out (TCO) device.

The PCM is disposed on a printed circuit board (PCB), and the PCB is electrically connected to the battery cell through welding or soldering.

Since the safety elements including the PCM have to be electrically connected to an electrode terminal of the battery cell and simultaneously have to maintain electrical insulation with other parts of the battery cell. Thus, an insulation tape is attached to each of members including the PCM.

However, such an insulation tap attaching method is vary troublesome and has no other function except for the insulation.

To solve the above-described problems, an upper case according to the related art is used as illustrated in FIG. 1.

FIG. 1 is a schematic view illustrating a structure of a battery pack provided with an upper case.

Referring to FIG. 1, the upper case provided in the battery pack according to the related art surrounds a front surface and a rear surface of a PCB connected to an upper end of a battery cell.

Also, the upper case is made of an electrically insulating material. Unlike the insulation tap attaching method, the upper case may be simply mounted or attached to an upper end of the battery cell, and even though an external impact is applied, the upper case may protect the PCB.

However, since the upper case has an opened top surface, foreign substances may be introduced therein. In addition, since the upper case is manually mounted or attached like the insulation tape attaching method, a lead time taken to produce battery packs may increase.

Thus, there is a need to develop a technique for preventing foreign substances from being introduced into the upper case that protects the PCB and for reducing the lead time of the battery pack.

PRIOR ART DOCUMENTS

Patent Documents (Patent Document 1) KR1023898 B

DISCLOSURE OF THE INVENTION

Technical Problem

The present invention provides a battery pack that protects a print circuit board (PCB) and has a lead time less than a conventional lead time and a method for manufacturing the same.

Technical Solution

A battery pack according to an embodiment of the present invention includes: a battery cell; a battery cell case including a PCB accommodation part in an upper portion thereof and a case lead part electrically connected to a tab of the battery cell; a printed circuit board (PCB) including a protection circuit for controlling an operation of the battery cell and mounted in the PCB accommodation part provided in the upper portion of the battery cell case so as to be coupled to the battery cell case; and an insulating top cap having two end surfaces and a pair of hook protrusions including a hook protrusion on each of the two end surfaces so as to be press-fitted onto the PCB and coupled to the PCB to face the PCB accommodation part and thereby to cover an entire surface of the PCB mounted in the PCB accommodation part.

The battery cell case may have a battery cell accommodation region, in which the battery cell is accommodated, in a region that does not overlap the PCB accommodation part.

The top cap may include a plurality of ribs that protrude from an inner surface of the top cap to provide partition walls between electronic components disposed on the PCB when the top cap is coupled to the PCB.

Each of the ribs may have a height corresponding to a difference between a height of the battery cell case and a height of the PCB mounted in the PCB accommodation part.

Each of the hook protrusions of the top cap may be disposed at a position that corresponds to the sum of a height of the ribs and a thickness of the PCB mounted in the PCB accommodation part.

The top cap may include a front member, a side member, and a top member, and a through-groove through which an external input/output terminal extends to the outside may be defined in the front member.

A heat dissipation hole for dissipating heat generated from positive (+) electrode/negative (−) electrode leads may be defined in the front member of the top cap, and the heat dissipation hole may be provided to allow a portion of the front member to retain a predetermined height so at to prevent the positive (+) electrode/negative (−) electrode leads from protruding to the outside.

The top cap may further include a rear member as a coupling reinforcement member for increasing coupling force with the battery cell.

A method for manufacturing a battery pack according to an embodiment of the present invention includes: a battery cell preparation step of preparing a battery cell having a sealed pouch shape; a PCB connection step of connecting a PCB including a protection circuit to the battery cell prepared in the battery cell preparation step; and a top cap coupling step of press-fitting a top cap onto the PCB connected to the battery cell in the PCB connection step.

The method may further include, before the PCB connection step, an input/output terminal connection step of connecting an external input/output terminal to the PCB.

The method may further include, before the PCB connection step, a battery cell coupling step of mounting the battery cell prepared in the battery cell preparation step in a battery cell accommodation part of the battery cell case including the battery cell accommodation part, a case lead part, and a PCB accommodation part to electrically couple a tab of the mounted battery cell to the case lead part of the battery cell case.

Before the PCB connection step, the case lead part of a battery case may be bent to the inside of the PCB accommodation part, and the PCB may be coupled thereon.

Advantageous Effects

In the battery pack and the method for manufacturing the same according to the embodiment of the present invention, the top surface of the upper case that protects the PCB may be provided to prevent the foreign substances from being introduced, and the hook protrusion may be formed on both the surfaces of the upper case so that the automation process is enabled to quickly produce the battery pack.

MODE FOR CARRYING OUT THE INVENTION

Hereinafter, embodiments of the present invention will be described in detail with reference to the accompanying drawings. However, the present invention is not limited to the embodiments below. Rather, these embodiments are provided so that this disclosure will be thorough and complete, and will fully convey the scope of the present invention to those skilled in the art.

Also, it will be understood that although the ordinal numbers such as first and second are used herein to describe various elements, these elements should not be limited by these numbers. The terms are only used to distinguish one component from other components. For example, a first element referred to as a first element in one embodiment can be referred to as a second element in another embodiment without departing from the scope of the appended claims. In the following description, the technical terms are used only for explaining a specific exemplary embodiment while not limiting the present invention. The terms of a singular form may include plural forms unless referred to the contrary.

While the term used in the present invention selects general terms that are widely used at present in consideration of the functions of the present invention, it is to be understood that this may vary depending on the intention or judicial precedent of those skilled in the art, the emergence of new technology, and the like. Also, in certain cases, there may be a term chosen arbitrarily by the applicant, and in this case, the meaning thereof will be described in detail in the description of the corresponding invention. Thus, the term used in the present invention should be defined based on the meaning of the term, not on the name of a simple term, but on the entire contents of the present invention.

Embodiment 1

Hereinafter, a battery pack according to an embodiment of the present invention will be described.

A battery pack according to an embodiment of the present invention is constituted by a battery cell, a PCB having a protection circuit, and a top cap having a closed top surface and provided with a hook protrusion that is press-fitted into the PCB to prevent the PCB from being damaged by external impact.

Figure 1:
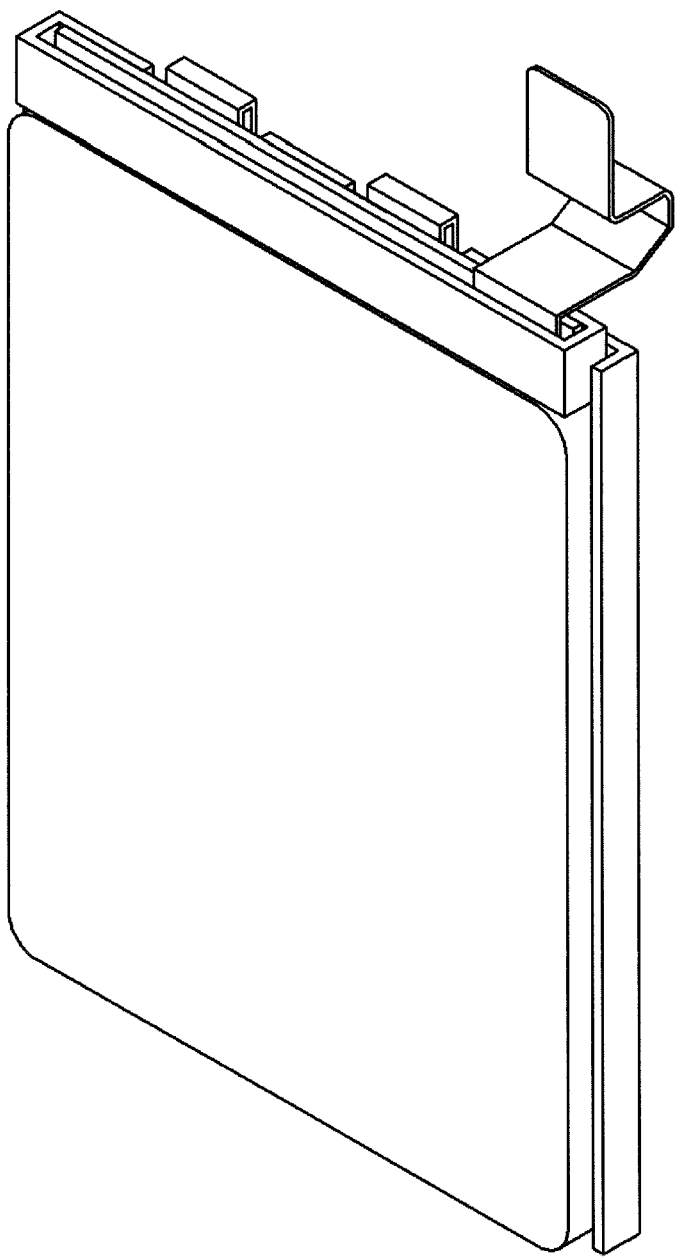
FIG. 1 is a schematic view illustrating a structure of a battery pack provided with an upper case.
Figure 2:
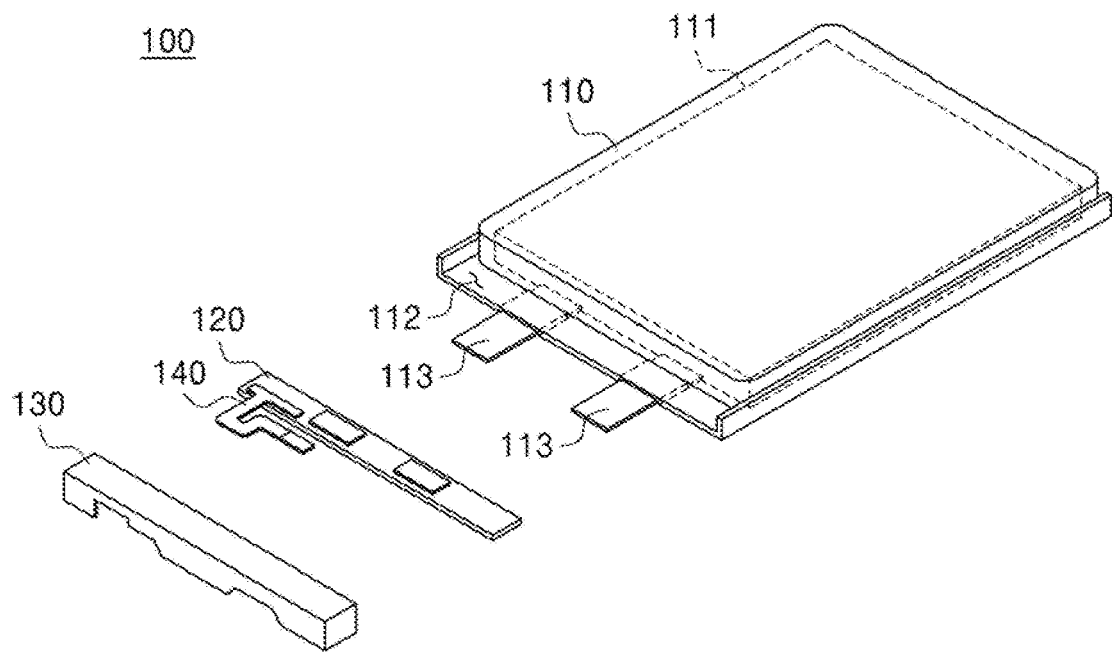
FIG. 2 is an exploded perspective view of a battery pack according to an embodiment of the present invention.

FIG. 2 is an exploded perspective view of the battery pack according to an embodiment of the present invention.

Referring to FIG. 2, a battery pack according to an embodiment of the present invention includes a battery cell 111, a battery cell case 110 including a PCB accommodation part in an upper portion thereof and a case lead part electrically connected to a battery cell tab, a printed circuit board (PCB) 120 including a protection circuit for controlling an operation of the battery cell 110 and mounted in a PCB accommodation part provided in the upper portion of the battery cell case 110 so as to be coupled to the battery cell case, and an insulating top cap 130 provided with a pair of hook protrusions on both end surfaces so as to be press-fitted into the PCB 120 and coupled to face the PCB accommodation part and thereby to cover an entire surface of the PCB mounted in the PCB accommodation part.

Also, each of the constituents of the following battery pack will be described in more detail.

Since the battery cell 111 generally uses a lithium secondary battery, the battery cell has a structure in which a plurality of positive electrodes (aluminum foil) and negative electrodes (copper foil) are laminated with a separator there between to form an electrode assembly.

Also, a positive electrode tab is welded to the positive electrode, and a negative electrode tab is welded to the negative electrode. The entire electrode assembly except for the positive electrode tab and the negative electrode tab may be wrapped by using an aluminum pouch to constitute the sealed battery cell 111.

Also, the aluminum pouch wrapping the electrode assembly is manufactured based on a highly ductile property and a thin aluminum layer, the battery cell 111 may be configured to maintain the shape of the electrode assembly and protect the inside thereof against an external impact by additionally mounting the battery cell case 110.

Also, in the battery cell 111, the aluminum pouch may constitute the battery cell case 110 without a separate additional case.

Also, the battery cell case 110 includes the PCB accommodation part 112 in the upper portion thereof and a case lead part 113 electrically connected to the tab of the battery cell. In the PCB accommodation part 112, left and right sides of the upper end of the battery cell case may further extend than the PCB so that the PCB is seated on an upper end of the battery cell case.

Also, the battery cell 111 is accommodated in a battery cell accommodation region within the battery cell case 110 provided in a region that does not overlap the PCB accommodation part 112.

Also, the PCB accommodation part 112 may be maintained in the insulation state by applying an insulation material such as an insulation tape therein.

Also, the case lead part 113 of the battery cell case is electrically connected to the tab of the battery cell. A constituent extending from the case lead part 113 to the inside of the battery cell case may be welded to the tab of the battery cell so that the battery cell and the case are electrically connected to each other.

The PCB 120 includes a protection circuit for controlling an operation of the battery cell 111 and is mounted in the PCB accommodation part 112 provided in an upper portion of the battery cell case 110. The PCB may be electrically connected to the battery cell 111 to prevent the battery cell 111 from being overcharged, overdischarged, or overheated and exploded due to overcurrent.

Also, the PCB 120 may include a safety element including a passive element such as a resistor and a condenser or an active element such as a field-effect transistor or a protection element in which integrated circuits are provided and an external input/output terminal 140 electrically connected to an external device to receive power from the battery pack 100.

Here, the shape of the external input/output terminal 140 is not limited to FIG. 2 and may be variously modified according to user's demands.

Also, the top cap 130 may be provided with the pair of hook protrusions 131 on both end surfaces thereof so as to be press-fitted into the PCB and be coupled to face the PCB accommodation part 112 and thereby to cover the entire surface of the PCB mounted in the PCB accommodation part 112. The top cap 130 may be made of an electrically insulating material.

In more detail, the top cap 130 may be made of a polymer material or paper having low conductivity. The polymer material may include a material including at least one or more of polyethylene (PE), polypropylene (PP), polystyrene (PS), polyethylene terephthalate (PET), polyamide (PA, nylon), polyester (PES), polyvinyl chloride (PVC), polyurethanes (PU), polycarbonate (PC), polyvinylidene chloride (PVDC), polytetrafluoroethylene (PTFE, Teflon), polyetheretherketone (PEEK, polyketone), and polyetherimide (PEI, Ultem).

Also, the top cap 130 has a long axis having a length less than that of the battery cell case 110 and a short axis greater than that of the PCB 120.

Also, the top cap 130 may be reduced in production cost because the production quantity of 4 pieces to 8 pieces per 1 mold increases to 16 pieces per 1 mold.

Also, the constituents of the top cap 130 will be described in more detail with reference to FIGS. 3 to 5.

Figure 3:
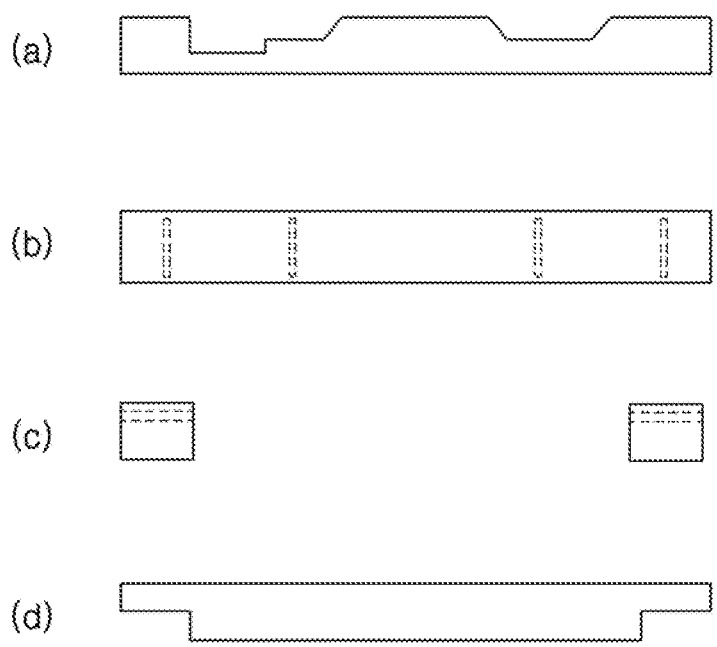
FIG. 3 is an overall cross-sectional view of a top cap within the battery pack according to an embodiment of the present invention.

FIG. 3 is an overall cross-sectional view illustrating the top cap within the battery pack according to an embodiment of the present invention.

Figure 4:
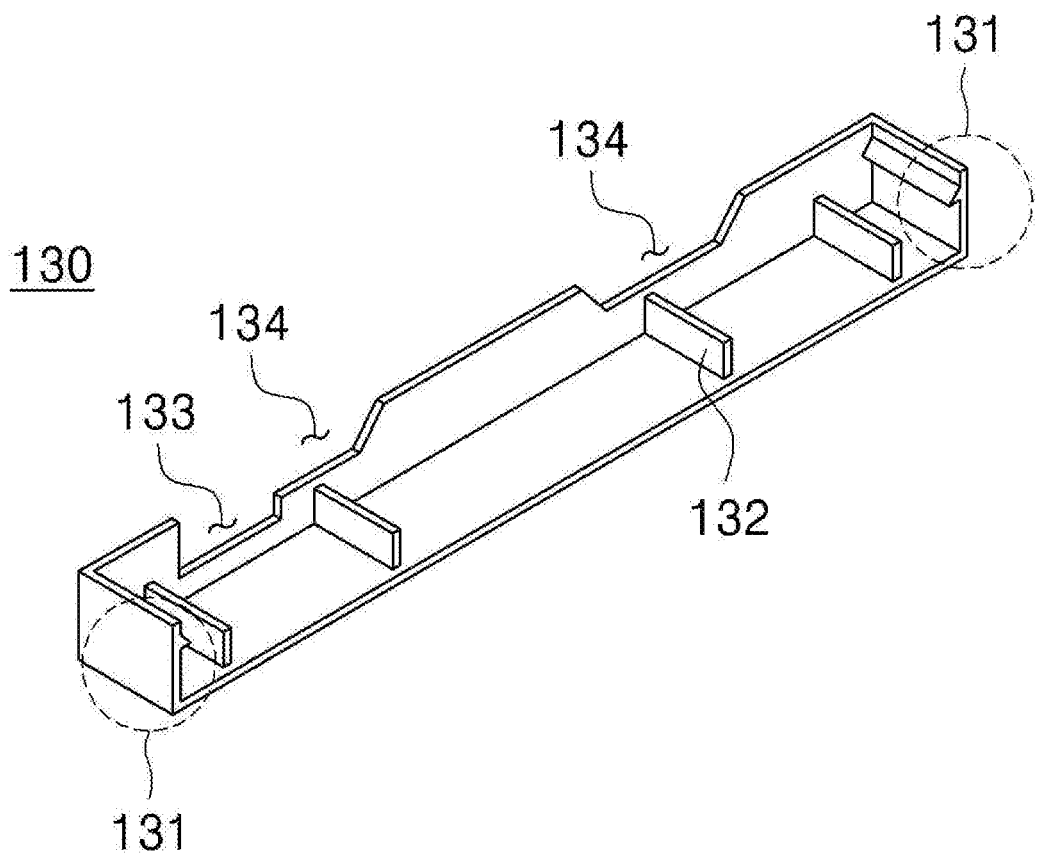
FIG. 4 is a perspective view illustrating the inside of the top cap within the battery pack according to an embodiment of the present invention.

FIG. 4 is a perspective view illustrating the inside of the top cap within the battery pack according to an embodiment of the present invention. That is, for facilitating the structural understanding, FIG. 4 is a view illustrating a configuration in which the members of the top cap 130 of FIG. 3 except for a rear member (d of FIG. 3) are coupled.

Figure 5:
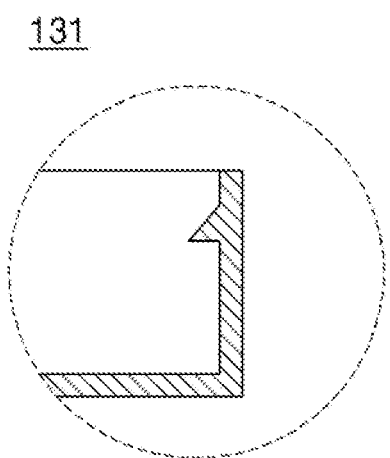
FIG. 5 is an enlarged view of a hook protrusion within the battery pack according to an embodiment of the present invention.

FIG. 5 is an enlarged view of the hook protrusion within the battery pack according to an embodiment of the present invention.

Referring to FIG. 3, the top cap 130 includes a front member (a of FIG. 3), a top member (b of FIG. 3), a side member (c of FIG. 3), and a rear member (d of FIG. 3).

The members of FIG. 3 are assembled through the general assembling method such as press-fitting, welding, adhesive bonding, and the like.

Also, referring to FIG. 4, the top cap 130 includes a pair of hook protrusions 131 disposed on the side member (c of FIG. 3), a plurality of ribs 132 disposed inside the top member (b of FIG. 3) and the front member (a of FIG. 3), a through-groove 133 defined in the front member (a of FIG. 3), and a pair of heat dissipation holes 134 defined in the front member (a of FIG. 3).

Also, referring to FIGS. 4 and 5, the pair of hook protrusions 131 is configured to stably fix the top cap 130 to the PCB 120. Thus, when the battery pack 100 drops down, frequency of separation of the PCB 120 may be reduced to more stably protect the PCB 120 as compared with the conventional structure.

Also, the pair of hook protrusions 131 are disposed symmetrical to each other on the side member (c of FIG. 3). Each of the pair of hook protrusions 131 has a triangular shape that protrudes to the inside of the top cap, but this embodiment is not limited thereto.

Also, the hook protrusion 131 may be determined in position so that the hook protrusion 131 is disposed at a position corresponding to the sum of a height of the rib 132 and a thickness of the PCB 120 mounted in the PCB accommodation part 112. Here, the position of the hook protrusion represents a position of a bottom surface (a bottom surface of the triangular shape in FIG. 5) of the hook protrusion.

Also, the plurality of ribs 132 protrude to the inside of the top member (b of FIG. 3) and the front member (a of FIG. 3). When the top cap is coupled to the PCB 120, the plurality of ribs 132 may provide partition walls between electronic components provided on the PCB 120 to perform electrostatic discharge (ESD).

Also, since the plurality of ribs 132 are disposed on positions on which a safety element and a protection element, which are disposed on the PCB 120, are not disposed, the positions of the ribs 132 may vary according to kinds, numbers, and positions of the safety element and the protection elements, which are disposed on the PCB 120.

Also, each of the plurality of ribs 132 may be disposed at a height that corresponds to a difference between a height of the battery cell case 110 and a height of the PCB 120 mounted in the PCB accommodation part 112 so that flatness of the battery cell case 110 and the top cap 130 match each other.

Also, four ribs 132 are provided as an example, but is not limited thereto.

Also, the through-groove 133 is defined in the front member (a of FIG. 3) so that the external input/output terminal 140 connected to the PCB 120 passes to the outside the top cap 130.

Also, the pair of heat dissipation holes 134 are defined in the front member (a of FIG. 3) to dissipate heat generated from the positive (+) electrode/negative (−) electrode leads of the battery cell case.

In general, the heat dissipation holes 134 are provided to allow a portion of the front member (a of FIG. 3) to remain by a predetermined height so that a portion of the hole that is completely opened due to the generation of heat from the positive (+) electrode/negative (−) electrode leads is partially hung on each of the positive (+) electrode/negative (−) electrode leads.

Thus, the heat dissipation holes 134 reduce the generation of heat in the positive (+) electrode/negative (−) electrode leads and prevent the positive (+) electrode/negative (−) electrode leads from protruding to the outside by various reasons such as falling of the battery pack 100 and the like.

Also, the top cap 130 may be a coupling reinforcement member for increasing coupling force with the battery cell and additionally include the rear member (d of FIG. 3).

Also, the rear member (d of FIG. 3) may be set to have a length of a short axis, which corresponds to the sum of a height of each of the ribs 132 and a thickness of the PCB 120 itself, so that the top cap 130 and the PCB 120 are more stably coupled to each other.

Embodiment 2

Hereinafter, a method for manufacturing the battery pack according to an embodiment of the present invention will be described.

In the method for manufacturing the battery pack according to an embodiment of the present invention, a battery cell is prepared, and a printed circuit board (PCB) is bonded to the prepared battery cell. Then, a top cap is press-fitted into the bonded PCB to manufacture a battery pack that protects the PCB.

Figure 6:
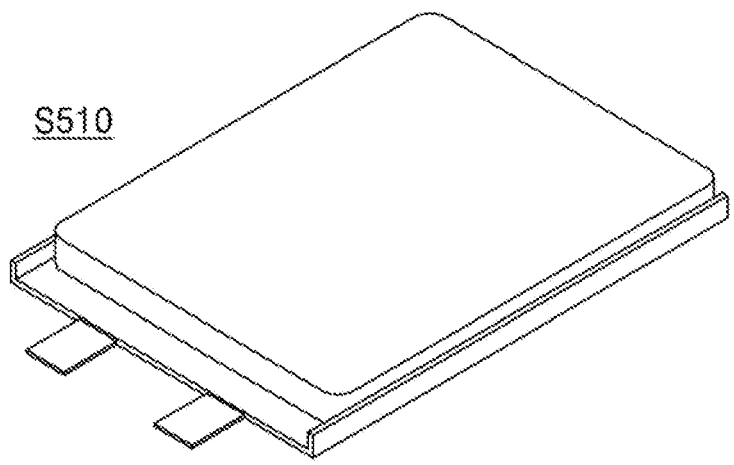
FIG. 6 is a schematic view illustrating a method for manufacturing a battery pack according to an embodiment of the present invention.
Figure 6:
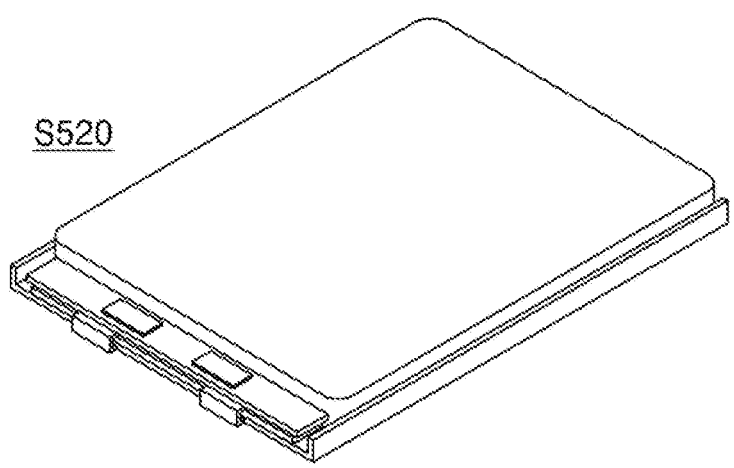
Figure 6:
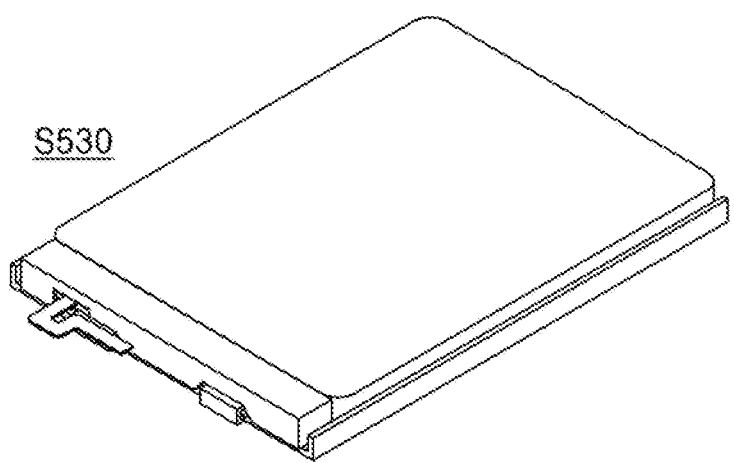

FIG. 6 is a schematic view illustrating a method for manufacturing the battery pack according to an embodiment of the present invention.

Referring to FIG. 6, a method for manufacturing the battery pack according to an embodiment of the present invention includes a process of preparing a battery pack having a sealed pouch shape (a battery cell preparation step: S510) and a process of connecting a PCB including a protection circuit to the battery cell prepared in the battery cell preparation step (S510) (a PCB connection step: S520).

In the PCB connection step (S520), a top cap is press-fitted into the PCB connected to the battery cell (a top cap coupling step: S530).

Also, each of the steps in the method for manufacturing the battery pack will be described below in more detail.

The battery cell preparation step (S510) is a step of preparing the battery cell having the sealed pouch shape. Here, various pouch-type battery cells such as a lithium polymer cell, a nickel cadmium cell, a nickel hydrogen cell, a nickel zinc cell, and the like as well as the lithium ion cell may be prepared.

For example, in the process of preparing the lithium ion cell, a plurality of positive electrode (aluminum foil) and negative electrode (copper foil) are laminated with a separator therebetween to form the battery cell.

Then, a positive electrode tab is welded to the positive electrode, and a negative electrode tab is welded to the negative electrode. Thereafter, the positive electrode and the negative electrode are wrapped by an aluminum pouch to realize a sealed structure.

In more detail, the process of manufacturing the battery cell is largely divided into three processes such as an electrode process, an assembly process, and an activation process. In the electrode process, materials for forming the positive electrode and the negative electrode are mixed at a proper ratio, and then, the positive electrode is coated with aluminum, and the negative electrode is coated with copper foil.

Then, the resultant is pressed in a constant thickness through a roll press to be flat; and then a slitting process is performed to cut the resultant so as to be matched with the electrode size.

Also, in the assembly process, a notching process for removing an unnecessary portion for the electrode is performed, and a positive electrode material, a separator, and a negative electrode material are alternately laminated on top of another. Then, a stack and folding process for folding the product several times according to capacity of the battery or a winding process for overlapping and rolling the electrodes and the separator are performed.

Then, the product is packaged by using an aluminum film package, an electrolyte is injected, and a sealing process for forming a vacuum state is performed.

Finally, in the activation (formation) process, the assembled battery cell, the assembled battery cell is repeatedly charged and discharged to activate the battery cell. The activation process is a process for performing a degassing process for exhausting a gas generated in the battery cell when being activated.

Also, after the battery cell, a battery cell coupling step in which the battery cell prepared in the battery cell preparation step (S510) is mounted in a battery cell accommodation part, and a tab of the mounted battery cell and a case lead part 113 of the battery cell case are electrically coupled to each other is additionally performed on the battery cell case.

This is done because the battery cell case is maintained in the form of an electrode assembly that is simply packed by using the aluminum film package and protects the inside thereof against an external impact. Thus, the cell case is mounted on the battery cell.

Thus, the battery cell is mounted in the battery cell accommodation part that is provided below the battery cell case, and tab leading out from the battery cell is connected to the case lead part provided on the battery cell case through welding. Then, an upper side of the batter cell case is covered to complete the assembly process.

Also, the PCB connection step (S520) is a step of connecting the PCB 120 including the protection circuit to the battery cell prepared in the battery cell preparation step (S510). Here, the lead leading out from the battery cell case 110 is coupled to the PCB 120 through spot welding or soldering.

In more detail, since the PCB 120 has to be seated in the PCB accommodation part 112 within the battery cell case, the positive (+) lead/negative (−) lead of the lead part 113 within the battery cell case are bent to the PCB accommodation part 112.

An electrical insulator is provided in the bent inner side of the lead to adjust a height of the lead, and then, the lead is coupled to the PCB 120.

Also, before the PCB 120 is connected, an input/output terminal connection step for previously connecting the external input/output terminal 140 provided on the PCB 120 is performed to quickly perform the processes.

Also, the top cap coupling step (S530) is a step for press-fitting the top cap into the PCB 120 connected to the battery cell in the PCB connection step (S520). This step will be described below in more detail.

Figure 7:
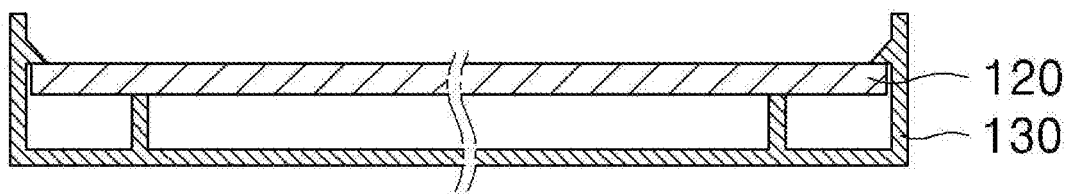
FIG. 7 is a combined side view of the top cap within the battery pack according to an embodiment of the present invention.

FIG. 7 is an overall side view of the top cap within the battery pack according to an embodiment of the present invention.

Referring to FIG. 7, the top cap 130 is press-fitted into the PCB 120. This may be produced by an automatic coupling manner using a jig or may be produced manually.

Also, after the top cap coupling step (S530), a label wrapping step for wrapping an outer surface of the battery cell is performed on the battery pack 100 so that the battery pack is maintained in the insulation state in which introduction of static electricity from the outside is prevented, and the whole constituents of the battery pack are fixed.

DESCRIPTION OF SYMBOLS

100: Battery pack
110: Battery cell case
111: Battery cell
112: PCB accommodation part
113: case lead part
120: PCB
130: top cap
131: hook protrusions
132: ribs
133: through-groove
134: heat dissipation holes

The invention claimed is:

1. A battery pack comprising:
a battery cell;
a battery cell case comprising a PCB accommodation part in an upper portion thereof and a case lead part electrically connected to a tab of the battery cell;
a printed circuit board (PCB) comprising a protection circuit for controlling an operation of the battery cell and mounted in the PCB accommodation part provided in the upper portion of the battery cell case so as to be coupled to the battery cell case; and
an insulating top cap having two end surfaces and a pair of hook protrusions including a hook protrusion on each of the two end surfaces so as to be press-fitted onto the PCB and coupled to the PCB to face the PCB accommodation part and thereby to cover an entire surface of the PCB mounted in the PCB accommodation part,
wherein the top cap comprises a plurality of ribs that protrude from an inner surface of the top cap to provide partition walls between electronic components disposed on the PCB when the top cap is coupled to the PCB,
wherein each of the hook protrusions of the top cap is disposed at a position that corresponds to the sum of a height of the ribs and a thickness of the PCB mounted in the PCB accommodation part, and
wherein the PCB is retained in a position between a top edge of the end surfaces of the top cap and a bottom edge of the end surfaces of the top cap.

2. The battery pack of claim 1, wherein the battery cell case has a battery cell accommodation region, in which the battery cell is accommodated, in a region that does not overlap the PCB accommodation part.

3. The battery pack of claim 1, wherein each of the ribs has a height corresponding to a difference between a height of the battery cell case and a height of the PCB mounted in the PCB accommodation part.

4. The battery pack of claim 1, wherein the top cap comprises a front member, a side member, and a top member, and
wherein a through-groove through which an external input/output terminal extends to the outside is defined in the front member.

5. The battery pack of claim 4, wherein a heat dissipation hole for dissipating heat generated from positive (+) electrode/negative (−) electrode leads is defined in the front member of the top cap, and
wherein the heat dissipation hole is provided to allow a portion of the front member to retain a predetermined height so at to prevent the positive (+) electrode/negative (−) electrode leads from protruding to the outside.

6. The battery pack of claim 4, wherein the top cap further comprises a rear member as a coupling reinforcement member for increasing coupling force with the battery cell.

7. A method for manufacturing a battery pack, the method comprising:
a battery cell preparation step of preparing a battery cell having a sealed pouch shape;
a PCB connection step of connecting a printed circuit board (PCB) comprising a protection circuit to the battery cell prepared in the battery cell preparation step; and
a top cap coupling step of press-fitting a top cap onto the PCB connected to the battery cell in the PCB connection step,
wherein the top cap coupling step comprises retaining the PCB between hooks on end surfaces of the top cap and ribs protruding from an inner surface of the top cap, and
wherein the PCB is retained in a position between a top edge of the end surfaces of the top cap and a bottom edge of the end surfaces of the top cap.

8. The method of claim 7, further comprising, before the PCB connection step, an input/output terminal connection step of connecting an external input/output terminal to the PCB.

9. The method of claim 7, further comprising, before the PCB connection step, a battery cell coupling step of mounting the battery cell prepared in the battery cell preparation step in a battery cell accommodation part of a battery cell case comprising the battery cell accommodation part, a case lead part, and a PCB accommodation part to electrically couple a tab of the mounted battery cell to the case lead part of the battery cell case.

10. The method of claim 7, wherein, before the PCB connection step, a case lead part of a battery case is bent to the inside of a PCB accommodation part, and the PCB is coupled thereon.

* * * * *